US009842343B2

(12) United States Patent
Cheloff et al.

(10) Patent No.: US 9,842,343 B2
(45) Date of Patent: Dec. 12, 2017

(54) SYSTEMS AND METHODS FOR AN ONLINE MARKETPLACE FOR ACCESSORIES OF A REMOTE MONITORING AND MANAGEMENT PRODUCT

(71) Applicant: ConnectWise Inc., Tampa, FL (US)

(72) Inventors: Brett Alan Cheloff, Tampa, FL (US); Chris Goetschius, Tampa, FL (US)

(73) Assignee: Connectwise, Inc., Tampa, FL (US)

( * ) Notice: Subject to any disclaimer, the term of this patent is extended or adjusted under 35 U.S.C. 154(b) by 409 days.

(21) Appl. No.: 13/860,931

(22) Filed: Apr. 11, 2013

(65) Prior Publication Data

US 2013/0311238 A1 Nov. 21, 2013

Related U.S. Application Data

(60) Provisional application No. 61/649,508, filed on May 21, 2012.

(51) Int. Cl.
| | |
|---|---|
| *G06Q 10/00* | (2012.01) |
| *G06Q 30/02* | (2012.01) |
| *G06Q 30/06* | (2012.01) |
| *G06Q 30/08* | (2012.01) |

(52) U.S. Cl.
CPC ..... *G06Q 30/0206* (2013.01); *G06Q 30/0601* (2013.01); *G06Q 30/08* (2013.01)

(58) Field of Classification Search
CPC .................................................. G06Q 30/0206
USPC ............................................. 705/7.11–7.42
See application file for complete search history.

(56) References Cited

U.S. PATENT DOCUMENTS

| | | | |
|---|---|---|---|
| 4,992,940 A * | 2/1991 | Dworkin | 705/26.8 |
| 5,509,070 A | 4/1996 | Schull | |
| 5,799,284 A | 8/1998 | Bourquin | |
| 6,058,417 A | 5/2000 | Hess et al. | |
| 6,067,582 A | 5/2000 | Smith et al. | |
| 6,178,408 B1 | 1/2001 | Copple et al. | |
| 6,343,738 B1 | 2/2002 | Ogilvie | |
| 6,615,253 B1 | 9/2003 | Bowman-Amuah | |
| 6,963,849 B1 | 11/2005 | Chaturvedi et al. | |
| 6,980,966 B1 | 12/2005 | Sobrado et al. | |
| 7,089,208 B1 | 8/2006 | Levchin et al. | |
| 7,222,078 B2 * | 5/2007 | Abelow | 705/1.1 |
| 7,346,647 B2 | 3/2008 | Bodine et al. | |
| 7,614,552 B2 | 11/2009 | Roseman et al. | |
| 7,620,566 B2 | 11/2009 | Tenorio | |

(Continued)

*Primary Examiner* — Amber A Misiaszek
(74) *Attorney, Agent, or Firm* — Foley & Lardner LLP

(57) ABSTRACT

Systems and methods of the present disclosure facilitate providing a marketplace for accessories of a remote monitoring and management product. In some embodiments, the system may be configured to create a first user account for a first user with a first number of points, and a second user account for a second user with a second number of points. The system may obtain a first RMM accessory item (e.g., a monitor, a data view, an antivirus definition, a search, a report, a script, a system component, a plugin, a probe, or a definition) and a corresponding price. Responsive to receiving an indication of interest, the system may transmit the first RMM accessory item to the second user, add to the first number of points a first multiplier times the price, and subtract from the second number of points a second multiplier times the price.

30 Claims, 11 Drawing Sheets

(56) References Cited

U.S. PATENT DOCUMENTS

| | | |
|---|---|---|
| 7,653,552 B2 | 1/2010 | Vaidyanathan et al. |
| 7,739,256 B2 | 6/2010 | Powell |
| 7,761,338 B1 | 7/2010 | Schneider et al. |
| 7,856,406 B2 | 12/2010 | Leventhal |
| 7,877,315 B2 | 1/2011 | Pickering |
| 7,895,081 B1 | 2/2011 | Saltzman et al. |
| 8,140,367 B2 | 3/2012 | Bernardini et al. |
| 2001/0051913 A1 | 12/2001 | Vashistha et al. |
| 2002/0120508 A1* | 8/2002 | Matsumoto et al. ........... 705/14 |
| 2003/0023514 A1 | 1/2003 | Adler et al. |
| 2004/0199466 A1 | 10/2004 | Chi |
| 2006/0190290 A1 | 8/2006 | Gomez |
| 2008/0319916 A1* | 12/2008 | Hoag et al. ..................... 705/80 |
| 2009/0037287 A1 | 2/2009 | Baitalmal et al. |
| 2009/0037337 A1 | 2/2009 | Baitalmal et al. |
| 2009/0265268 A1 | 10/2009 | Huang et al. |
| 2010/0299219 A1 | 11/2010 | Cortes et al. |
| 2011/0077993 A1 | 3/2011 | Sailer et al. |
| 2011/0145056 A1 | 6/2011 | Sullivan et al. |
| 2011/0218920 A1 | 9/2011 | Agrawal et al. |
| 2011/0296401 A1 | 12/2011 | Depoy |
| 2012/0072307 A1 | 3/2012 | Kassaei et al. |
| 2012/0214451 A1 | 8/2012 | Richardson et al. |
| 2012/0290428 A1 | 11/2012 | Ben-Bassat et al. |
| 2013/0104236 A1* | 4/2013 | Ray et al. ....................... 726/25 |

* cited by examiner

SYSTEMS AND METHODS FOR AN ONLINE MARKETPLACE FOR ACCESSORIES OF A REMOTE MONITORING AND MANAGEMENT PRODUCT

CROSS-REFERENCE TO RELATED PATENT APPLICATIONS

This application claims priority to and benefit of U.S. Provisional Patent Application No. 61/649,508, titled "ONLINE MARKETPLACE FOR A REMOTE MONITORING AND MANAGEMENT SYSTEM," and filed on May 21, 2012, the entirety of which is hereby incorporated by reference.

FIELD OF THE DISCLOSURE

The present disclosure generally relates to online marketplaces for software. More specifically, the present disclosure relates to an online marketplace for accessories of a remote monitoring and management (RMM) product.

BACKGROUND OF THE INVENTION

RMM products can be used to monitor and manage the systems of end users. The RMM products may be designed to be extensible, and serve as a platform for many device management functions. RMM products may be enhanced by adding accessories to them that work with the platform to provide additional functionality.

SUMMARY OF THE INVENTION

Systems and methods of the present disclosure provide a marketplace for accessories of an RMM product. The marketplace may increase the value and power of the RMM product by extending its capabilities beyond its original design, and also by keeping its functionality up to date with the changing environment around it.

At least one aspect of the present disclosure is directed to a system for providing a marketplace for accessories of a remote monitoring and management product. In some embodiments, the system executes on at least one processor of a server. The system may be configured to create a first user account for a first user of the system in a first memory. The first user account may indicate a first number of points. The system may also be configured to create a second user account for a second user of the system in the first memory, and the second user account may indicate a second number of points. The first user may transmit a first of at least one RMM accessory item to a second memory. The first RMM accessory item may include at least one of a monitor, a data view, an antivirus definition, a search, a report, a script, a system component, a plugin, a probe, and a definition. The first user may also transmit a price to a third memory, wherein the price is a third number of points. The second user may transmit the first RMM accessory item to the second user. The system may add a first multiplier times the price to the first number of points, and may subtract a second multiplier times the price from the second number of points.

At least one aspect of the present disclosure is directed to a method for providing a marketplace for accessories of a remote monitoring and management product executing on at least one processor of a server. The method can include creating, in a first memory communicatively coupled to the at least one processor, a first user account for a first user of the system. The first user account may indicate a first number of points. The method can also include creating, in the first memory, a second user account for a second user of the system The second user account may indicates a second number of points. The method can include transmitting, from the first user to a second memory, responsive to the first user, a first of at least one RMM accessory item including at least one of a monitor, a data view, an antivirus definition, a search, a report, a script, a system component, a plugin, a probe, and a definition. The method can also include transmitting, from the first user to a third memory, responsive to the first user, a price for the first RMM accessory item. The price can be a third number of points. The method can also include transmitting, from the second memory to the second user, responsive to the second user, the first RMM accessory item. The method can include adding, to the first number of points, a first multiplier times the price. The method can also include subtracting, from the second number of points, a second multiplier times the price.

At least one aspect is directed to a system for providing a marketplace for accessories of a remote monitoring and management ("RMM") product. The system may execute on at least one processor of a server. In some embodiments, the system may include a user module, accessories module, and a prices module. In some embodiments, the system creates, via a user module communicatively coupled to the at least one processor, a first user account for a first user of the system. The first user account can indicate a first number of points. The system may be configured to create, via the user table module, a second user account for a second user of the system. The second user account can indicate a second number of points. The system can be configured to obtain, from the first user via an accessories module, a first RMM accessory item for an RMM product. The first RMM accessory item may include at least one of a monitor, a data view, an antivirus definition, a search, a report, a script, a system component, a plugin, a probe, and a definition. The system can be configured to obtain, from the first user via a prices module, a price for the first RMM accessory item, wherein the price comprises a third number of points. The system can be configured to transmit, via the accessories module, the first RMM accessory item to the second user. The system may transmit the first RMM accessory responsive to receiving, from the second user, an indication of interest in the first RMM accessory item. The system can be configured to add, to the first number of points, a first multiplier times the price. The system can be configured to subtract, from the second number of points, a second multiplier times the price.

In some embodiments, the value of the price is zero.

In some embodiments, the first multiplier is a number greater than zero and less than or equal to one. The second multiplier may be a number greater than or equal to one.

In some embodiments, the system is further configured to obtain a second RMM accessory item. The system may obtain the second RMM accessory item from a third user affiliated with the provider of the RMM product. The system can be further configured to receive, from the third user via the prices module, a price for the second RMM accessory item. The price may include a fourth number of points.

In some embodiments, the system is further configured to recommend the first RMM accessory item to the second user. The system may make the recommendation based on a history of activity by the second user.

In some embodiments, the system is further configured to obtain a newer version of the first RMM accessory item. The system may obtain the newer version from the first user via the accessories module. The system may, responsive to obtaining the newer version, transmit, the newer version to the second user.

In some embodiments, the first RMM accessory item is a remedy for a zero-day attack.

At least one aspect is directed to a method for providing a marketplace for accessories of a remote monitoring and management ("RMM") product executing on at least one processor of a server, the method comprising. In some embodiments, the method includes creating a first user account for a first user of the system. The first user account can be created via a user module. The first user account may indicate a first number of points. The method may include creating a second user account for a second user of the system. The second user account may indicate a second number of points. The method may include obtaining, from the first user via an accessories module, a first RMM accessory item for an RMM product, the first RMM accessory item comprising at least one of a monitor, a data view, an antivirus definition, a search, a report, a script, a system component, a plugin, a probe, and a definition. The method may include obtaining, from the first user via a prices module, a price for the first RMM accessory item. The price may include a third number of points. The method may include transmitting the first RMM accessory item to the second user. The method may include transmitting the first RMM accessory item responsive to receiving, from the second user, an indication of interest in the first RMM accessory item. The method may include adding, to the first number of points, a first multiplier times the price. The method may include subtracting, from the second number of points, a second multiplier times the price.

At least one aspect of the present disclosure is directed to a non-transitory computer-readable storage device having instructions that are executable to cause one or more processors to provide a marketplace for accessories of a remote monitoring and management ("RMM") product. In some embodiments, the instructions include instructions to create a first user account for a first user of the system. The first user account may indicate a first number of points. The instructions may include instructions to create second user account for a second user of the system. The second user account indicates a second number of points. The instructions may include instructions to obtain, from the first user, a first RMM accessory item for an RMM product. The first RMM accessory item may include at least one of a monitor, a data view, an antivirus definition, a search, a report, a script, a system component, a plugin, a probe, and a definition. The instructions may include instructions to obtain, from the first user, a price for the first RMM accessory item. The price may include a third number of points. The instructions may include instructions to transmit, the first RMM accessory item to the second user. The instructions may include instructions to transmit the first RMM accessory item responsive to receiving, from the second user, an indication of interest in the first RMM accessory item. The instructions may include instructions to add, to the first number of points, a first multiplier times the price. The instructions may include instructions to subtract, from the second number of points, a second multiplier times the price.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Systems and methods of the present disclosure are directed to an online marketplace for information technology management add-ons, such as accessories for a remote monitoring and management ("RMM") product. For example, and in some embodiments, the present technology allows users of the online marketplace to author, design or develop RMM accessory items, such as a monitor, a data view, an antivirus definition, a search, a report, a script, a system component, a plugin, a probe, and a definition, and share, exchange, sell or otherwise transfer the RMM accessory item to a second user of the online marketplace. In some embodiments, the first user providing the RMM accessory item may sell the RMM accessory item to a second user in exchange for points, while in other embodiments the first user may provide the RMM accessory item to the second user for free or a monetary value.

Figure 1:
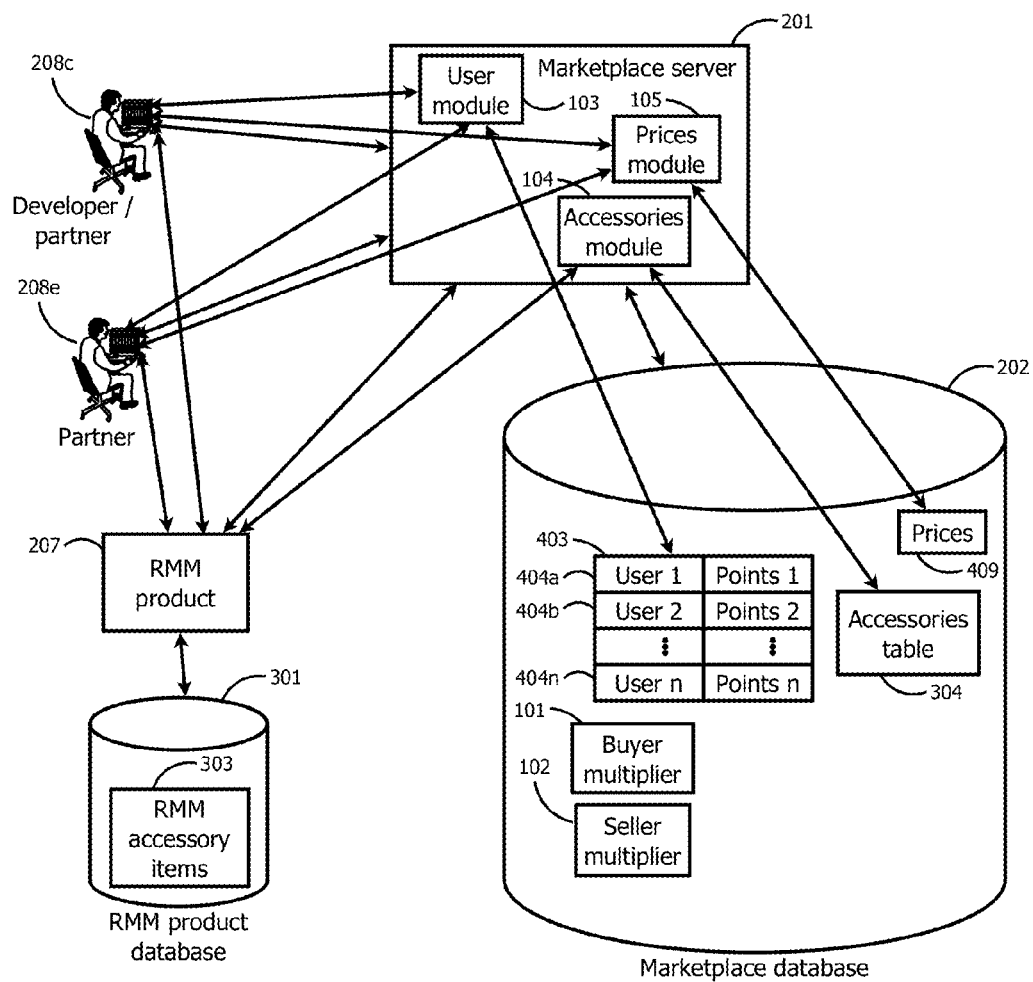
FIG. 1 is an illustrative block diagram of an embodiment of a system for an online marketplace for accessories of an RMM product.

FIG. 1 is an illustrative block diagram of an embodiment of a system for an online marketplace for accessories of an RMM product. A system may provide a marketplace for RMM accessory items 303 of an RMM product 207. The system may execute on at least one processor of a marketplace server 201. In some embodiments, the system may include a user module 103, accessories module 104, or prices module 105 configured to provide one or more functions of the online marketplace. The system may be configured to create, such as via a user module 103 executing on a processor, in a first memory that is the user table 403 in the marketplace database 202 and is communicatively coupled to the processor of the marketplace server 201, a first user account 404a for a first user 208c of the system, who is a developer. The first developer account 404a may indicate a number of points. The system may be configured to create, in the user table 403, a second user account 404b for a second user 208e of the system, who is a partner. The second user account 404b may indicate a number of points. The system may be configured to receive, retrieve, or otherwise obtain, via an accessories module 104, at least one RMM accessory item from the developer 208c and store, log, index, categorize or otherwise maintain the RMM accessory item in a second memory that is the accessories table 304 in the marketplace database 202. The system may be configured to obtain, via the prices module 105, a price, which is a number of points, from the developer 208c and store or otherwise log the price in a third memory that is the prices table 409 in the marketplace database 202. The system may receive, from partner 208e, an indication of interest in the RMM accessory item. For example, the partner 208e may indicate, via a user interface, an interest to purchase, rent, download, demo trial, view or otherwise interact with an aspect of the RMM accessory item. Responsive to receiving the indication of interest in the RMM accessory item, the system may be configured to transmit the RMM accessory item from the accessories table 304 to the partner 208e, and then add the price times a seller multiplier 102 to the points in the developer account 404a, and subtract the price times a buyer multiplier from the points in the partner account 404b.

The system and its components, such as an RMM product 207, marketplace server 201, marketplace database 202, user module 103, accessories module 104, or prices module 105, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
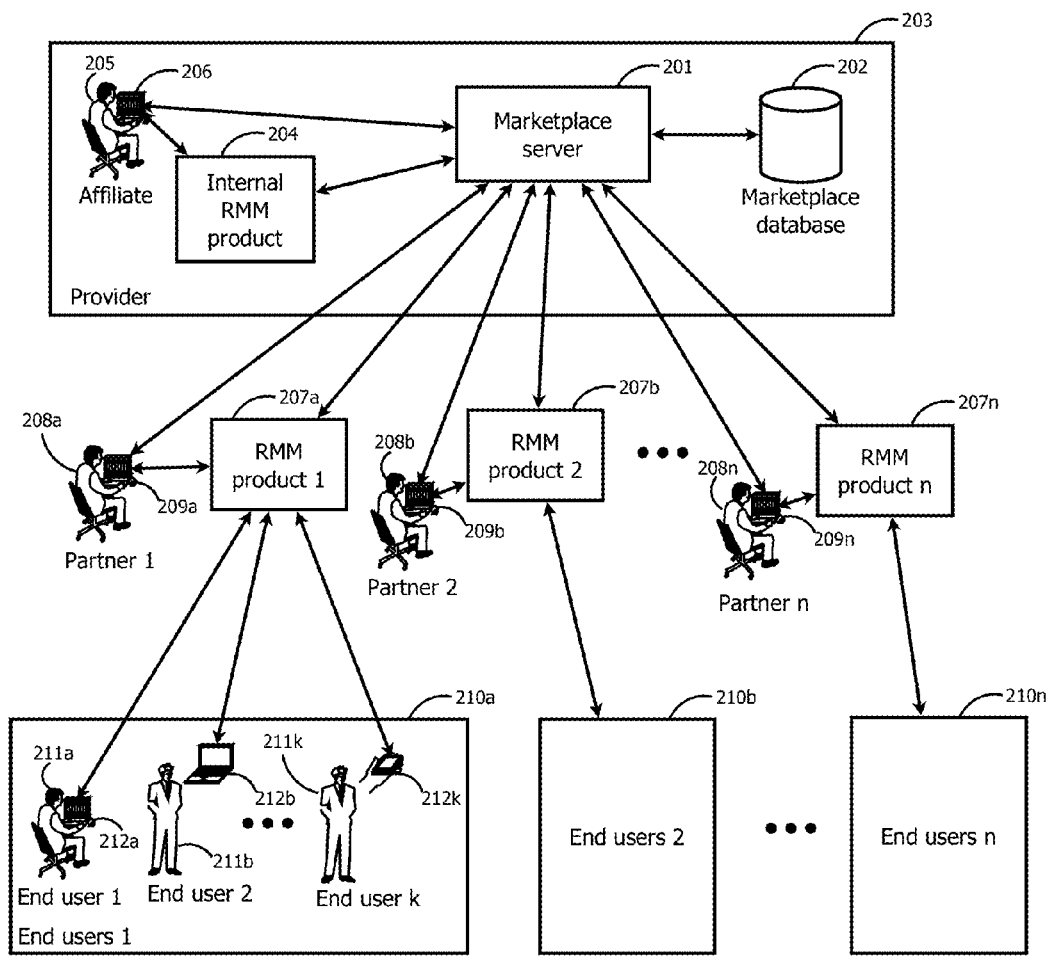
FIG. 2 is an illustrative block diagram of an embodiment of the interaction between an online marketplace and an RMM product.

FIG. 2 is an illustrative block diagram of an embodiment of the interaction between an online marketplace and an RMM product. The provider 203 of the online marketplace can use a marketplace server 201 to provide the service. The marketplace server 201 can use a marketplace database 202 to store information in support of the marketplace. The marketplace server 201 can deliver services to RMM products 207 through an Application Programming Interface (API). The marketplace server 201 can also provide services directly to partners 208. The partners 208 can access the marketplace server 201 using devices 209, which can access the services through an API, or through a standard browser interface using the HTTP protocol, or by other means. A device 209 can access the marketplace server 201 through an API using custom client software on the device 209 that implements the client interface to the API.

The partners 208 can be in the business of providing Information Technology (IT) services to support the devices 212 of end users 211, as well as supporting the end users 211 directly. End user devices 212 may include, e.g., computing devices, desktop computers, laptop computers, notebook computers, mobile or portable computing devices, tablet computers, smartphones, personal digital assistants, or any other computing device with which IT services are associated. The partners 208 can use the RMM product 207 to run this business more efficiently and cost effectively by automating some or all of the monitoring and management of the devices 212 of end users 211. As exemplified in FIG. 2, partner 208a can use the RMM product 207a to connect with devices 212a-212k of the end users 210a. The RMM product 207a can then use the connection to monitor conditions on the devices 212a-212k and initiate appropriate actions on the devices 212a-212k when indicated. Similarly, partner 208b can use the RMM product 207b to connect with the devices 212 of the end users 210b, and the RMM product 207b can use the connection to monitor conditions and initiate appropriate actions on the devices 212 of the end users 210b. This pattern is repeated for additional partners; partner 208n can use the RMM product 207n to connect with the devices 212 of the end users 210n, and the RMM product 207n can use the connection to monitor conditions and initiate appropriate actions on the devices 212 of the end users 210n.

The end users 211 can access the RMM product 207 using devices 212. The devices 212 can access the RMM product 207 through an API, or through a standard browser interface using the HTTP protocol, or by other means. A device 212 can access the RMM product 207 through an API using custom client software on the device 212 that implements the client interface to the API. The functions provided by the RMM product 207 to end users 211 may be different from the functions provided by the RMM product 207 to partners 208. In one embodiment, the functions provided by the RMM product 207 to end users 211 may be oriented toward improving the communication between end users 211 and the partners 208 managing the devices 212 for those end users 211.

An affiliate 205 affiliated with the provider 203 of the marketplace can also access the marketplace server 201 using a device 206, which can access the services through an API, or through a standard browser interface using the HTTP protocol, or by other means. The device 206 can access the marketplace server 201 through an API using custom client software on the device 206 that implements the client interface to the API. The provider 203 may also have an internal RMM product 204. The marketplace server 201 can deliver services to the internal RMM product 204 through an Application Programming Interface (API) in the same way that it can deliver services to the external RMM products 207. The marketplace server 201 may deliver different services to the internal RMM product 204 than it delivers to the external RMM products 207. The affiliate 205 may be an employee or consultant, or may have some other affiliation with the provider 203. The affiliate 205 may have different requirements and privileges with respect to the marketplace server 201 than the partners 208 and the end users 212, because the affiliate 205 may be doing development, support, or other internal business functions on the marketplace server 201.

Figure 3:
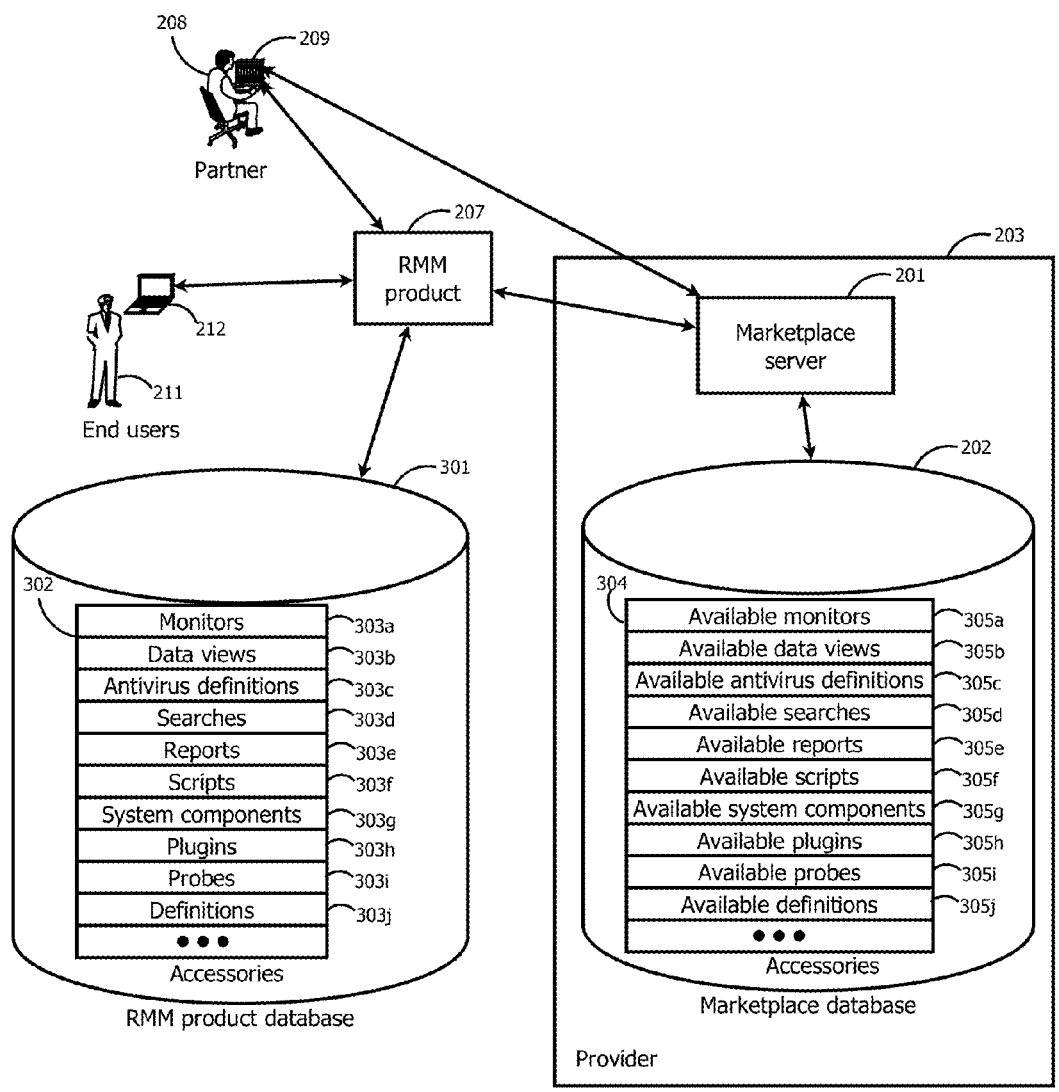
FIG. 3 is an illustrative block diagram of an embodiment of the components of an online marketplace.

FIG. 3 is an illustrative block diagram of an embodiment of the components of an online marketplace. The RMM product 207 can use an RMM product database 301 to store control information and data from end user devices 212 being monitored and managed. The RMM product database 301 stores a set of RMM accessory items 302. These RMM accessory items 303 can customize and enhance the functionality of the RMM product 207. The RMM accessory items 302 can include monitors 303a, data views 303b, antivirus definitions 303c, searches 303d, reports 303e, scripts 303f, system components 303g, plugins 303h, probes 303i, and definitions 303j. The architecture of the RMM product 207 and the RMM product database 301 allows for the addition of other types of RMM accessory items 302 as indicated by the ellipsis.

Monitors 303a are definitions of certain conditions on the end user devices 212 that can be brought to the attention of the partner 208. For example, one monitor may be a definition of the condition where a disk drive on an end user device 212 has less than 5% of its total capacity free. The partner 208 may want to know about this condition, because computer operating systems may not react well to running out of free disk space, so the partner 208 may want to do some work to free some disk space. Monitors can be implemented using queries on the RMM product database 301 against data that is collected about end user devices 212.

Data views 303b are definitions of concise, interesting, and informative ways of presenting information to the partner 301. The information that is presented is taken from the database 301, and may contain information about end user devices 212. The data views 303b can make it easier for the partner 301 to understand what is happening on the end user devices 212, and may also help to determine what, if any, actions to take to properly manage those devices 212. For example, one data view may display all the end user devices 212 with software on them that has not yet been activated, and provide a link to see what software is not activated on any one device 212. This data view can make it much easier for the partner 208 to monitor and help enforce software licensing compliance. Data views can be implemented using queries on the RMM product database 301 against data that is collected about end user devices 212.

Antivirus definitions 303c are parametric data that can be used by antivirus software on end user devices 212 in order to properly detect and respond to various forms of malicious threats. Antivirus definitions 303c can be maintained and updated by the vendor of the antivirus software, but the partner 208 may want to use the RMM product 207 to manage antivirus definitions in a way to make it easier to keep a more controlled and uniform environment on the end user devices 212. For example, one set of antivirus definitions may be the set of updates released for the Norton Antivirus product by Symantec of Mountain View, Calif.

Searches 303d can help the partner 208 find important information quickly. They are similar to data views 303b but can be particularly designed for finding specific important pieces of information rather than showing an overall picture. For example, one search may provide the percentage of end user devices 212 on which the most recent backup operation failed, giving a meaningful metric about the success of the overall backup process. Searches can be implemented using queries on the RMM product database 301 against data that is collected about end user devices 212.

Reports 303e can help the partner 208 explain and justify various aspects of system management to the end users 211 of the end user devices 212. Reports 303e can also be used in the billing process of the partner 208. For example, one report may show a list of all the problems that were automatically solved over the last month by the RMM product 207, along with an estimate of the amount of time that was saved by automating the solution of the problems. Reports can be implemented in two parts. The first part can be a query on the RMM product database 301 against data that is collected about end user devices 212. The second part can be a page layout that formats the result of the query into a report that is easy to read and understand.

Scripts 303f can be a powerful and flexible mechanism for extending the power of the RMM product 207. Scripts are general programmatic descriptions of operations that can run on either the RMM product 207 or end user devices 212. Scripts can be extremely flexible because they have access to information about the end user devices 212, they can access the RMM product database 301, and they can take many useful actions directly on end user devices 212. For example, one script may check to see how much memory and CPU is currently being used, and kill some optional processes if the usage is above a certain threshold. Scripts can be designed and implemented by the partner 208, and new scripts can be added and used for monitoring and managing end user devices 212 without needing to change the software on the RMM product 207 itself. Scripts can be implemented using a scripting language that is designed to work with the RMM product 207.

System components 303g are actual executable code and data files that can extend the implementation of the RMM product 207 itself. System components can be much more powerful than the other types of RMM accessory items 303 because they can change the fundamental operation of the RMM product 207. For example, one system component may add new functionality to the RMM product 207 to allow it to monitor and manage mobile devices such as the iPhone by Apple Computer of Cupertino, Calif. Since system components can affect the RMM product 207 at a very fundamental level, they may only be created by the provider of the RMM product 207, and may not be created or modified by a partner 208.

Plugins 303h are pieces of executable code that are loaded dynamically by the RMM product 207 during startup. Plugins can use an API to communicate with the RMM product 207. The API can provide interfaces to initialize the plugin 303h, send and receive data from the RMM product 207, request services from the RMM product 207, and receive events from the RMM product 207. For example, one plugin may provide a new display that shows a pictorial representation of the network based on network information gathered by all the end user devices 212. Plugins can be implemented using standard development tools such as Microsoft Visual Studio by Microsoft Corporation of Redmond, Wash.

Probes 303*i* define a series of tests and conditions that can be used with data gathered using Simple Network Management Protocol (SNMP). Probes 303*i* can allow the RMM product 207 to detect and characterize devices that are connected in the same network as the end user devices 212. SNMP may not directly provide this information, so the additional information from a probe 303*i* can be valuable. For example, one probe may discover and gather information about all of the routers in the network that are made by Linksys of Irvine, Calif. Probes can be implemented in two parts. The first part can be an SNMP request and response represented as a Management Information Base (MIB). The second part can be an update to the RMM product database 301 using the information that is gathered by the MIB.

Definitions 303*j* are collections of structured user documentation for the partner 208. Definitions can provide useful information about managing end user devices 212. The RMM product 207 is set up to make the information in a definition 303*j* easy to search and browse. For example, one definition may describe details about common setup configurations in small businesses for routers made by Netgear of San Jose, Calif. Definitions can be implemented using a definition editor that is part of the RMM product 207.

The marketplace database 202 stores a set of RMM accessory items 304 that can be used to update an RMM product 207 by adding to or updating its RMM product database 301. The RMM accessory items 304 can contain available monitors 305*a*, available data views 305*b*, available antivirus definitions 305*c*, available searches 305*d*, available reports 305*e*, available scripts 305*f*, available system components 305*g*, available plugins 305*h*, available probes 305*i*, and available definitions 305*j*. The architecture of the marketplace server 201 and its marketplace database 202 allows for the addition of other types of RMM accessory items 304 as indicated by the ellipsis.

The marketplace database 202 can have an RMM accessory item 305 that is not present in an RMM product database 301. Similarly, an RMM product database 301 can have an RMM accessory item 303 that is not present in the marketplace database 202. For example: a partner 208 may want an RMM accessory item 305 in the marketplace database 202 and be willing to pay for it (a purchase), or the partner 208 may have an RMM accessory item 303 that is valuable, and may be willing to share it using the marketplace database 202 for a price (a sale).

Figure 4:
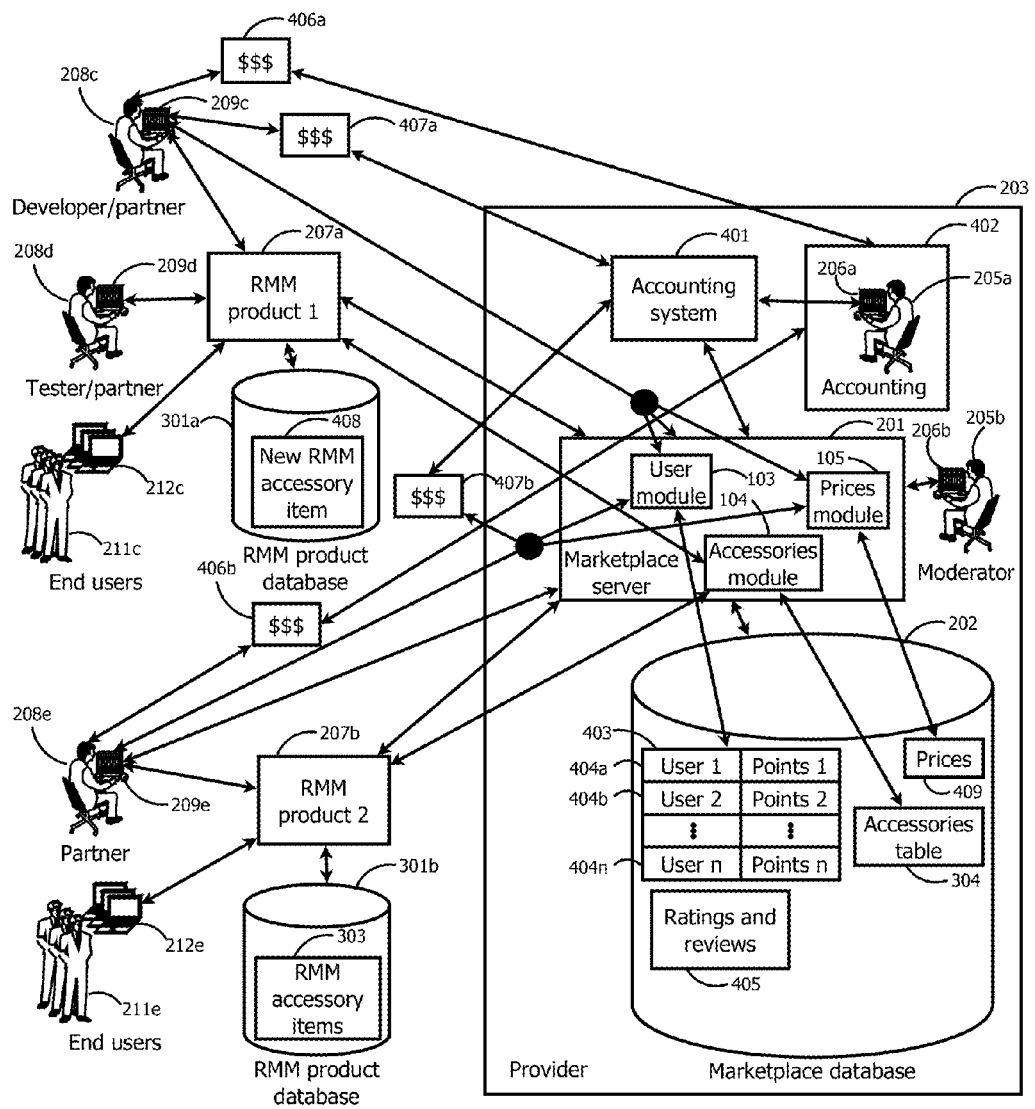
FIG. 4 is an illustrative block diagram of an embodiment of at least one transaction in an online marketplace.

FIG. 4 is an illustrative block diagram of an embodiment of at least one transaction in an online marketplace. A developer 208*c*, who may also be a partner, can use an RMM product 207*a* to create a new RMM accessory item 408 in the RMM product database 301*a*. The RMM accessory item can be a monitor 303*a*, a data view 303*b*, a search 303*d*, a report 303*e*, a script 303*f*, a plugin 303*h*, a probe 303*i*, a definition 303*j*, or some other kind of RMM accessory item supported by the RMM product 207, as described with respect to FIG. 3. As described with respect to FIG. 3, an antivirus definition 303*c* can be created by the company that sells the antivirus product, and a system component 303*g* can be created by the company that sells the RMM product 207. A tester 208*d*, who may also be a partner, can use a test device 209*d* in conjunction with the RMM product 207*a* to test and verify the operation of the new RMM accessory item 408. The developer 208*c* and tester 208*d* can work together to fix any problems and improve the utility and ease of use of the new RMM accessory item 408, and to decide when they feel that the RMM accessory item 408 is ready for use by others.

In one embodiment, an affiliate 205 of the provider 203 can be a developer. The affiliate 205 may use an internal RMM product 204 to create a new RMM accessory item, analogous to the process described above for the developer 208*c*. It should be understood that the rest of the description with respect to FIG. 4 applies to a developer that is an affiliate 205 of the provider 203, the same way it applies to a developer 208*c* that is not an affiliate of the provider 203.

When the new RMM accessory item 408 is ready, a set of selected end users 211*c* may be enlisted to try the new RMM accessory item 408 and test it further, to evaluate its utility and effectiveness. The developer 208*c* may make further changes to the new RMM accessory item 408, and at some time may decide that the new RMM accessory item 408 is ready for general distribution.

The developer 208*c* can set up and configure an account on the marketplace server 201, using the user module 103 through a client program running on a device 209*c* connected directly to the marketplace server 201, indirectly through the RMM product 207*a*, or by some other means. If the developer 208*c* chooses to use the RMM product 207*a*, much of the work to set up and configure the account can be automated using information that was set up on the RMM product 207*a* when it was configured. The set up and configuration of an account is only needed once; from then on the developer 208*c* can use the same account for every interaction with the marketplace server 201. The marketplace server 201 can store the account information in a user table 403 in its database 202. The user table 403 has an entry 404 for every user with an account.

The developer 208*c* can use the accessories module 104, through the RMM product 207*a*, to place the new RMM accessory item 408 into the marketplace. The RMM product 207*a* can use the account information of the developer 208*c* to authenticate the connection with the marketplace server 201, and then can use the API to copy the new RMM accessory item 408 from the RMM product database 301*a* to the marketplace server 201. The marketplace server 201 can store, such as via accessories module 104 executing on a processor of the server, the new RMM accessory item 408 in the accessories table 304 in its database 202, and identify it as belonging to the user account 404 that is associated with the developer 208*c*. At the same time, the API can allow the developer 208*c* to associate additional information with the RMM accessory item, for example, a text description of the RMM accessory item and images of the RMM accessory item in operation.

The provider 203 of the online marketplace may wish to moderate the submissions to the marketplace, for example, to verify their validity, inspect them to avoid the introduction of malicious activity, or to do some testing and quality assurance on them. The provider 203 may implement a policy to make RMM accessory items 305 in the marketplace unavailable for use by partners 209 until a moderator 205*b* uses a client interface on a device 206*b* to mark the new RMM accessory item 304 as being available for use by partners 209.

A partner 208*e* who wishes to use the marketplace server 201 can either use the API either directly through a client program running on a device 209*e* connected directly to the marketplace server 201, or indirectly by the RMM product 207*b*. The partner 208*e* can set up and configure an account on the marketplace server 201, using the API either directly through a client program running on a device 209e connected directly to the marketplace server 201, or indirectly through the RMM product 207b. If the partner chooses to use the RMM product 207b, much of the work can be automated using information that was set up on the RMM product 207b when it was configured. The set up and configuration of an account is only needed once; from then on the partner 208e can use the same account for every interaction with the marketplace server 201. The marketplace server 201 can store the account information in a user table 403 in its database 202. The user table 403 has an entry 404 for every user with an account.

The partner 208e can then use a search or classification browsing function to peruse RMM accessory items of interest that are stored in the accessories table 304 of the marketplace database 202. If the partner 208e wants the new RMM accessory item 408 made by the developer 208c, the partner 208e can use the accessories module 104, via the RMM product 107b, to request the new RMM accessory item 408. The RMM product 207b can use the account information of the partner 208e to authenticate the connection with the marketplace server 201, and then can use the API to copy the new RMM accessory item 408 from the RMM accessory items 305 in the marketplace database 202 to the RMM accessory items 303 in the RMM product database 301b. The new RMM accessory item 408 can then be used by the partner 208e to help monitor and manage the devices 212e of the end users 211e that are connected to the RMM product 207b.

The user table 403 in the marketplace database 202 associates a number of points with each user by storing the points in the account information 404. This number of points is zero or a positive integer and represents the amount of value that the user has available for transactions in the marketplace.

In some embodiments, the online marketplace server 201, such as via a prices module 105, can allow a developer to set a price for an RMM accessory item. For example, developer 208c can set a price for the new RMM accessory item 408. The price may be set in units of points, and may be stored, via the prices module 105, in the prices table 409 of the marketplace database 202 along with information to associate the price with the RMM accessory item. The price can have a zero value, indicating that the price of the RMM accessory item is "free", and access to the copy of the RMM accessory item in the marketplace is unrestricted. The price can have a value greater than zero, indicating that access to the new RMM accessory item 408 requires a transaction that transfers value from the buyer to the seller.

The process of transferring value from the buyer to the seller is shown with an example that is meant to be illustrative rather than limiting. For example, if the price of the new RMM accessory item 408 is a positive integer p, and user record 404a is associated with the developer 208c, and user record 404b is associated with partner 208e, and partner 208e uses the marketplace server 201 to transfer the new RMM accessory item 408 to the RMM product 207b, then in conjunction with that transfer, the marketplace server 201 can subtract p from the points in user record 404b, and add p to the points in user record 404a. If the number of points in user record 404b is less than p before the transaction, then the marketplace server 201 may or may not allow the transaction to proceed, depending on the credit policy of the provider 203 of the marketplace. A negative number of points in a user record indicates that the provider 203 is extending credit to that user.

Additionally, the marketplace server 201 can take a commission on the transfer, and can charge the commission to either the buyer, the seller, or both. Continuing the example from above, ifs is a number greater than zero and less than or equal to one, and b is a number greater than or equal to one, then the marketplace server 201 can add p*s to the points in user record 404a, and can subtract p*b from the points in user record 404b. If s is less than one, then the seller, developer 208c, is being charged a commission on the transaction. If b is greater than one, then the buyer, partner 208e, is being charged a commission on the transaction. If any commissions are charged, then the total of all the points for all users in the user table 403 decreases after the transaction. In this way, the provider 203 of the marketplace can force the creation of additional points from other sources over time, as transactions decrease the number of available points.

The points can be bought with real money, and redeemed for real money, through the accounting system 401 of the provider 203. A partner 208e can add more points to the user record 404 associated with the partner 208e, in the user table 403 in the marketplace database 202, by transferring money to the accounting system 401. The transfer can be done directly with an online transaction 407b. The transfer can also be done by sending a financial instrument 406b (such as a check or cash) to a person 205a in the accounting department 402, who records the deposit in the accounting system 401 using a device 206a. After the deposit is complete, the accounting system 401 can use the marketplace server 201 to update the user table 403 by adding the appropriate number of points to the user record 404 associated with the partner 208e.

A developer 208c can redeem points, acquired from selling the new RMM accessory item 408, for real money. The developer 208c can request the money from the accounting system 401. The transfer can be done directly with an online transaction 407a. The transfer can also be done by requesting a financial instrument 406a (such as a check or cash) from a person 205a in the accounting department 402, who records the withdrawal in the accounting system 401 using a device 206a. After the withdrawal is complete, the accounting system 401 can use the marketplace server 201 to update the user table 403 by subtracting the appropriate number of points from the user record 404 associated with the developer 208c.

In one embodiment, the provider 203 of the online marketplace is also the provider of the RMM product 207. In this embodiment, the provider 203 may allow the developer 208c to use points to pay for fees associated with the RMM product 207a, such as the license fee for using the software on the RMM product 207a. If the developer 208c chooses to exercise this option, the accounting system 401 can manage the transaction since it already manages billing the developer 208c, and it can use the marketplace server 201 to update the user table 403 by subtracting the appropriate number of points from the user record 404 associated with the developer 208c.

In one embodiment, the accounting system 401 is provided by a third-party financial transaction provider, such as PayPal of San Jose, Calif. The third-party provider may choose to use points, or may use an actual currency for transactions.

After using the new RMM accessory item 408 for a while, the partner 208e may form an opinion about the quality and utility of the new RMM accessory item 408, and may have suggestions on how to improve it. The marketplace server 201 allows the partner 208e to update ratings and reviews 405 stored in the marketplace database 202. The ratings and reviews 405 may be a valuable resource to the developer 208c by providing valuable feedback about how partners are using the new RMM accessory item 408. The ratings and reviews 405 may also be a valuable resource to other partners 208 by giving them an independent assessment of the quality of the new RMM accessory item 408 and possibly helping them to make a decision about purchasing the new RMM accessory item 408. The ratings and reviews 405 may also provide general information about the quality of the work done by the developer 208c, by showing a history of the perceived value of RMM accessory items offered by the developer 208c.

The marketplace server 201 can also provide updates, such as via an accessories module 104. The developer 208c can fix problems or add functions to the new RMM accessory item 408, and use the accessories module 104 to update the accessories table 304 with the new version of the new RMM accessory item 408. The RMM product 207b can poll the marketplace server 201, either periodically, as the result of a notification from the marketplace server 201, or on demand at the request of the partner 208e. As a result of the polling, the RMM product 207b may discover that the version of the new RMM accessory item 408 in its RMM product database 301b is older than the version of the new RMM accessory item 408 in the marketplace database 202. The RMM product 207b can initiate an update of the new RMM accessory item 408. The marketplace server 201 can verify that the partner 208e has previously purchased the new RMM accessory item 408, and can then transfer, via the accessories module 104, a copy of the newer version from the accessories table 304 in the marketplace database 202 to the RMM accessory items 303 in the RMM product database 301b. The entire update process may happen automatically without any manual intervention by the partner 208e, or it may require manual confirmation by the partner 208e.

The update process may be valuable in detecting and mitigating malicious attacks known as zero-day attacks. A zero-day attack on a device uses a previously undiscovered vulnerability, and therefore cannot be stopped using traditional anti-virus techniques. An RMM product 207 may be able to detect and report on general behaviors associated with malicious attacks, and a developer 208c may be able to create an RMM accessory item to defend against the attack on devices of end users 211. The marketplace may serve as a way for the developer to distribute this new RMM accessory item to a large audience of partners 208, and may therefore provide an effective way to improve the defense against zero-day attacks.

The partner 208e in FIG. 4 may need to develop RMM accessory items from time to time in order to effectively use the RMM product 207b to monitor and manage end user devices 212e. Thus, the partner 208e may take on the role of developer as described so far with reference to FIG. 4. When a partner 208e needs a function from the RMM product 207b, one effective way for the partner 208e to work may be to first use the marketplace server 201 to search for an existing RMM accessory item that provides the needed function. If the partner 208e can find the desired RMM accessory item, the partner 208e can purchase it and use it. If the partner 208e cannot find the desired RMM accessory item, that partner 208e may want to take on the role of developer 208c, develop an RMM accessory item for the function, and offer it for sale in the marketplace. This activity by partners 208 may be valuable to the provider of the RMM product 207, by leveraging the abilities and expertise of the partners 208 to improve the RMM product 207. This activity may also be valuable to the partners 208, by providing a constantly improving RMM product 207, which may help to provide better and more efficient service to the end users 211.

In one embodiment, the marketplace server 201 may maintain a history of the buying patterns and purchased items for the partners 208. The marketplace server 201 may use this history to predict what RMM accessory items in the accessories table 304 are most likely to be useful to a partner 208, and recommend these useful RMM accessory items to the partner 208. In another embodiment, the marketplace server may use information from the RMM product 207 to help predict what RMM accessory items in the accessories table 304 are most likely to be useful to the partner 208 using that RMM product 207. In one embodiment, the information from the RMM product 207 may include information about the end user devices 212.

The marketplace can serve as a free market facilitating the exchange of RMM accessory items 303 between partners 208 with or without a profit motive 406-407. This may be valuable to partners 208 using an RMM product 207 because the needs of the partners 208 may evolve rapidly, and the partners 208 may understand the product requirements better and sooner than the provider of the RMM product 207. The partners 208 may have a high level of technical skill, so the partner 208e, the developer 208c, and the tester 208d exemplified in FIG. 4 may all be the same entity. A particularly skilled partner 208 may use the marketplace to trade this skill for discounts in operating expenses of the RMM product 207, or partners 208 with different skill sets may use the marketplace to trade the values of their respective skills.

The one or more servers associated with the marketplace server 201, RMM product 207, accounting system 401, or end user device 212 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The communicative couplings in FIG. 4 may be through a network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

Figure 5:
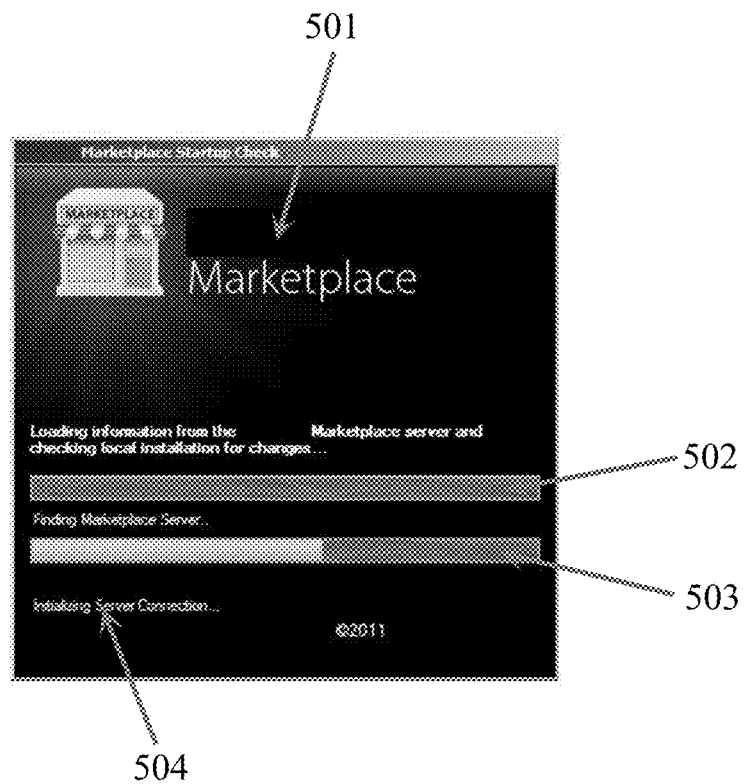
FIG. 5 is an illustrative example of an embodiment of a user interface for the initialization of an online marketplace.

FIG. 5 is an illustrative example of an embodiment of a user interface for the initialization of an online marketplace. An attractive visual icon 501 may identify the marketplace. Progress bars 502 and 503 may indicate to the partner 208 how far along the initialization process has run, and a text display 504 may keep the partner 208 informed about what kind of initialization is currently in progress.

Figure 6:
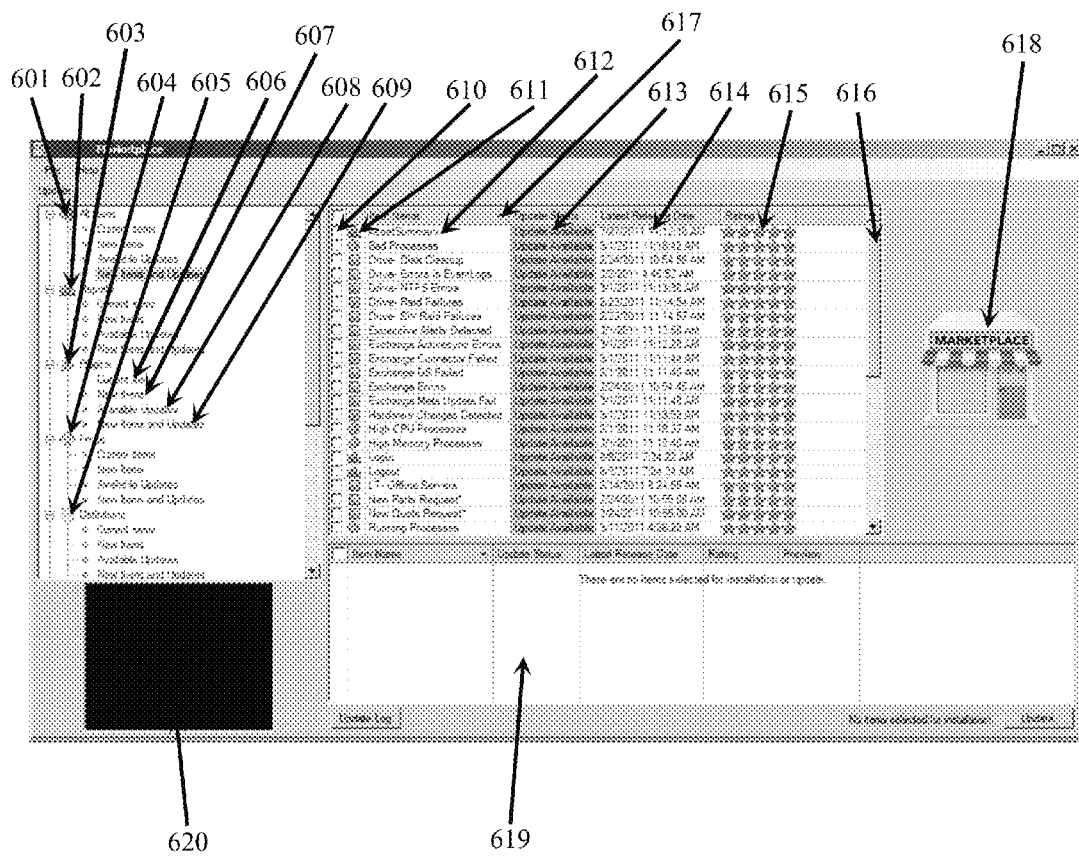
FIG. 6 is an illustrative example of an embodiment of a user interface for controlling an online marketplace.

FIG. 6 is an illustrative example of an embodiment of a user interface for controlling an online marketplace. An attractive visual icon 620 may identify the RMM product, and another icon 618 may identify the marketplace. A hierarchical browse control may allow the partner 208 to select "All Items" 601 in the marketplace, or to select one type of RMM accessory item "Reports" 602, "Plugins" 603, "Probes" 604, "Definitions" 605, or others not visible in FIG. 6. Each of these selections may allow the selection of "Current Items" 606, "New Items" 607, "Available Updates" 608, or "New Items and Updates" 609. "Current Items" 606 may show all RMM accessory items that are on the RMM product 207. "New Items" 607 may show all RMM accessory items that are in the marketplace but not on the RMM product 207. "Available Updates" 608 may show all RMM accessory items that are on the RMM product 207 and are also in the marketplace where they have a newer version. "New Items and Updates" 609 may show all RMM accessory items that are in either the "New Items" list 607 or the "Available Updates" list 608. When the marketplace is first accessed by the partner 208, the initial default display may show "New Items and Updates" 609 for "All Items" 601 in the marketplace.

In an illustrative example, RMM accessory items may include: asset summary, bad processes, drive—disk cleanup, drive—errors in event logs, drive—NTFS errors, drive—RAID failures, drive—SW Raid failures, excessive alerts detected, Exchange ActivesSync errors, Exchange connector failed, Exchange DS failed, Exchange errors, Exchange meta update fail, hardware changes detected, high CPU processes, high memory processes, login, logout, LT-offline servers, new parts request, new quote request, running processes, etc.

The detail display may show a line for each RMM accessory item selected by the browse control described above. Each line may have an update control 610 allowing the partner 208 to select it for update, and several columns of information about each RMM accessory item. The information may include the type 611, the name 612, the status 613, the release date 614, and the rating 615. The status 613 of the RMM accessory item may indicate the relationship of the RMM accessory item in the marketplace to the RMM accessory item on the RMM product 207. For example, the "Update Available" status shown 613 indicates that the RMM accessory item is both on the RMM product 207 and in the marketplace, but the marketplace contains a later version.

The status values may be computed using a set of identifying information about the RMM accessory item (its "name") and a checksum of the RMM accessory item that uniquely identifies its version. There may also be additional information about the RMM accessory item that is stored along with the RMM accessory item. There may be a number of different status values. The "Update Available" status value described earlier may indicate that the name of the RMM accessory item on the RMM product 207 matches the name of a RMM accessory item in the marketplace and the checksum on the RMM product 207 matches the checksum of an earlier version of that RMM accessory item in the marketplace, but not the latest version. The "Current" status may indicate that the name of the RMM accessory item on the RMM product 207 matches that of a RMM accessory item in the marketplace, and the checksum on the RMM product 207 matches that of the latest RMM accessory item in the marketplace. The "Changed" status may indicate that the name of the RMM accessory item on the RMM product 207 matches that of a RMM accessory item in the marketplace, but the checksum on the RMM product 207 does not match the checksum of any version of that RMM accessory item in the marketplace, so that the RMM accessory item on the RMM product 207 is a new version of an existing RMM accessory item (this may only be true for a developer 208c). The "New" status may indicate that the RMM accessory item is in the marketplace, but no RMM accessory item exists on the RMM product 207 with that name, indicating that the RMM accessory item is a new one that the partner 208 may want to add to the RMM product 207. The "Local New" status may indicate that no RMM accessory item exists in the marketplace with the name of the RMM accessory item on the RMM product 207, indicating that it is a completely new RMM accessory item (this may only be true for a developer 208c).

An RMM accessory item can be marked in the marketplace as one that is no longer being used. If the name for an RMM accessory item on the RMM product 207 matches that of an RMM accessory item in the marketplace that is marked this way, then the status may be shown as "Deprecated", indicating that the RMM accessory item may need to be replaced with a different one that has the same function.

There may be other more complicated status values based on additional information about the RMM accessory item. For example, the status can be "Pending Approval" for a new RMM accessory item or version that has been uploaded but not yet approved by the management of the marketplace, or "Requires Upgrade" for an RMM accessory item that cannot be installed until other RMM accessory items or core software is updated on the RMM product 207, or "Inconsistent" for an RMM accessory item that appears to be present but is not set up correctly or is missing other required RMM accessory items or core software that are required for its correct operation.

The list of RMM accessory items can be sorted by column using controls 617 in the column headers, and can be scrolled 616 to see items that are not currently visible in the display. When the partner selects an RMM accessory item for update by checking the box next to the RMM accessory item using the update checkbox 610, it may be copied to the update queue area 619. For example, since no items are selected for update as exemplified in FIG. 6, the update queue area 619 is empty.

Figure 7:
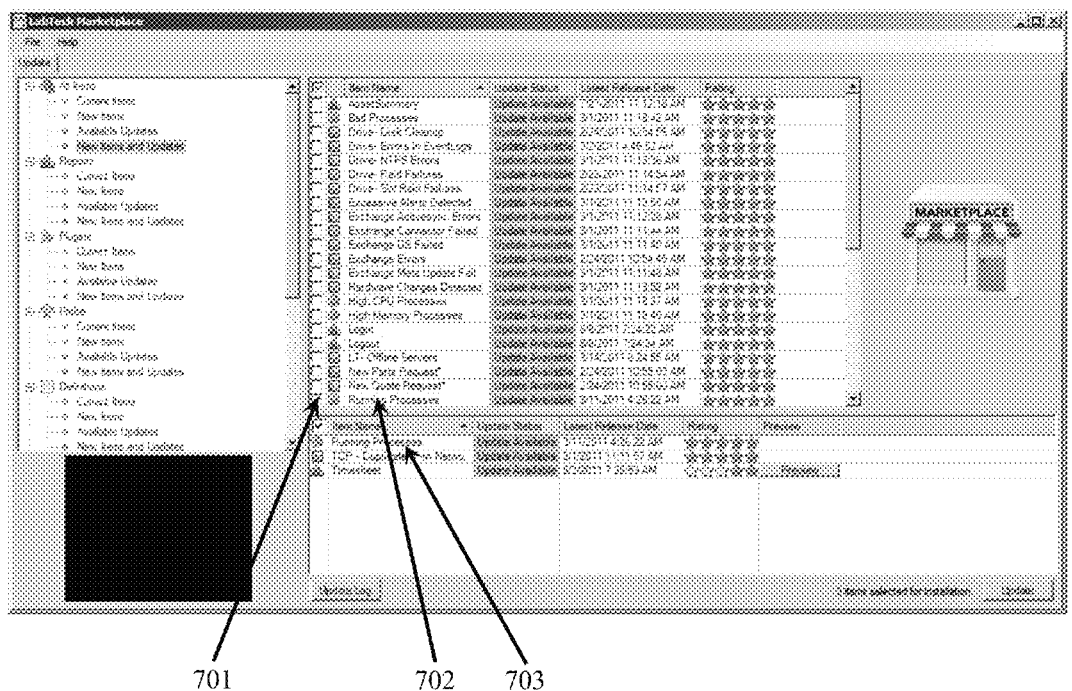
FIG. 7 is an illustrative example of an embodiment of a user interface for selecting items from an online marketplace.

FIG. 7 is an illustrative example of an embodiment of a user interface for selecting items from an online marketplace. When the partner checks the box next to the RMM accessory item "Running Processes" 702 using the checkbox 701, the box 701 may be checked, and the information about the "Running Processes" RMM accessory item 702 may be copied into the update queue area 703.

Figure 8:
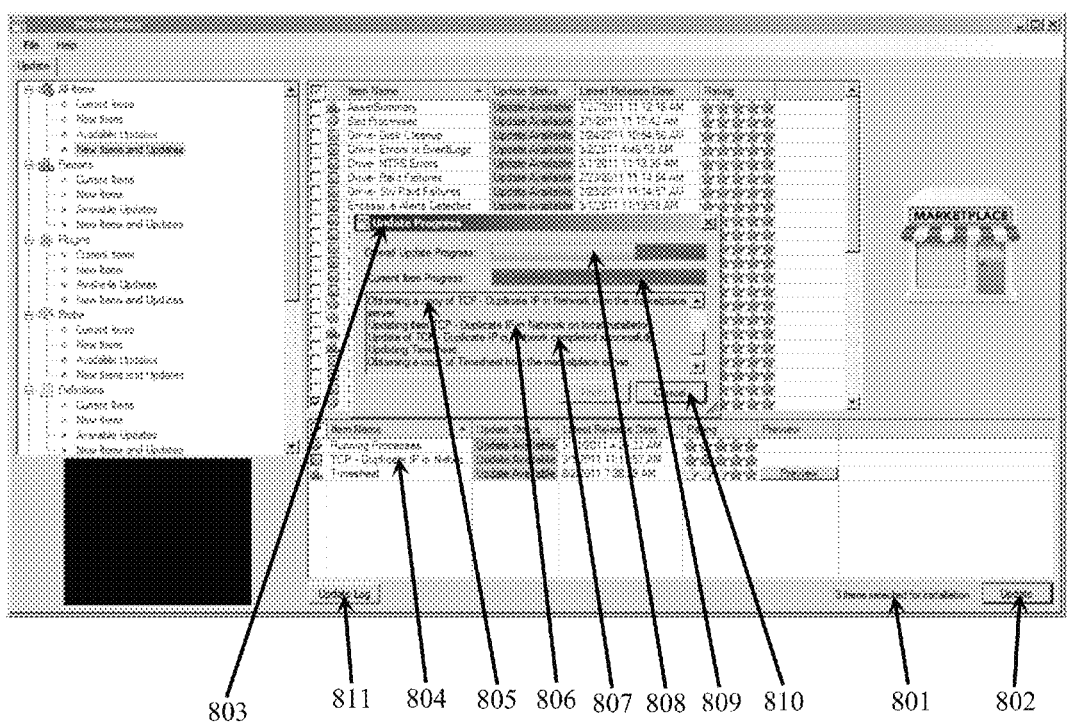
FIG. 8 is an illustrative example of an embodiment of a user interface for accessing a software update from an online marketplace.

FIG. 8 is an illustrative example of an embodiment of a user interface for accessing a software update from an online marketplace. A text display 801 may show the partner 208 what operations are pending based on the contents of the update queue. The partner 208 may initiate the update process by selecting the "Update" button 802. This may start the processing of all RMM accessory items in the update queue, and may invoke the display of the "Update Progress" dialog 803. The dialog may show a progress bar 809 for the single RMM accessory item currently being processed, as well as a progress bar 808 for the operation of processing all the RMM accessory items in the update queue. When a single RMM accessory item 804 is processed, a text display may indicate 805 when the new RMM accessory item is received from the marketplace, then may indicate 806 when the new RMM accessory item is installed in the RMM product 207, and finally may indicate 807 the status of the update operation for the RMM accessory item. The partner can cancel the update operation at any time by selecting the "Cancel" button 810. When the entire operation is completed, the partner can review a detailed log of all marketplace operations by selecting the "Update Log" button 811.

Figure 9:
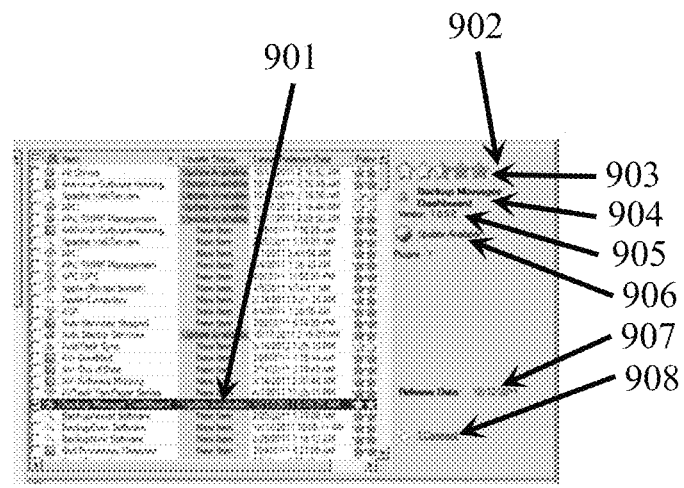
FIG. 9 is an illustrative example of an embodiment of a user interface for displaying information about an item in an online marketplace.

FIG. 9 is an illustrative example of an embodiment of a user interface for displaying information about an item in an online marketplace. An RMM accessory item can be selected 901 by indicating it using a pointing device. This is independent of checking the box 701 that adds the RMM accessory item to the update queue 619 as described in FIG. 7. When an RMM accessory item is selected 901 in this way, it may be highlighted, and the information area 902 to the right of the list of RMM accessory items may be used to display information about the RMM accessory item. FIG. 9 shows, by way of example, some of the information that can be displayed about an RMM accessory item: its current rating 903, the name of the RMM accessory item 904, its version 905, its status 906, the date it was released 907, and the number of user-supplied comments about it, along with a link to those comments 908.

Figure 10A:
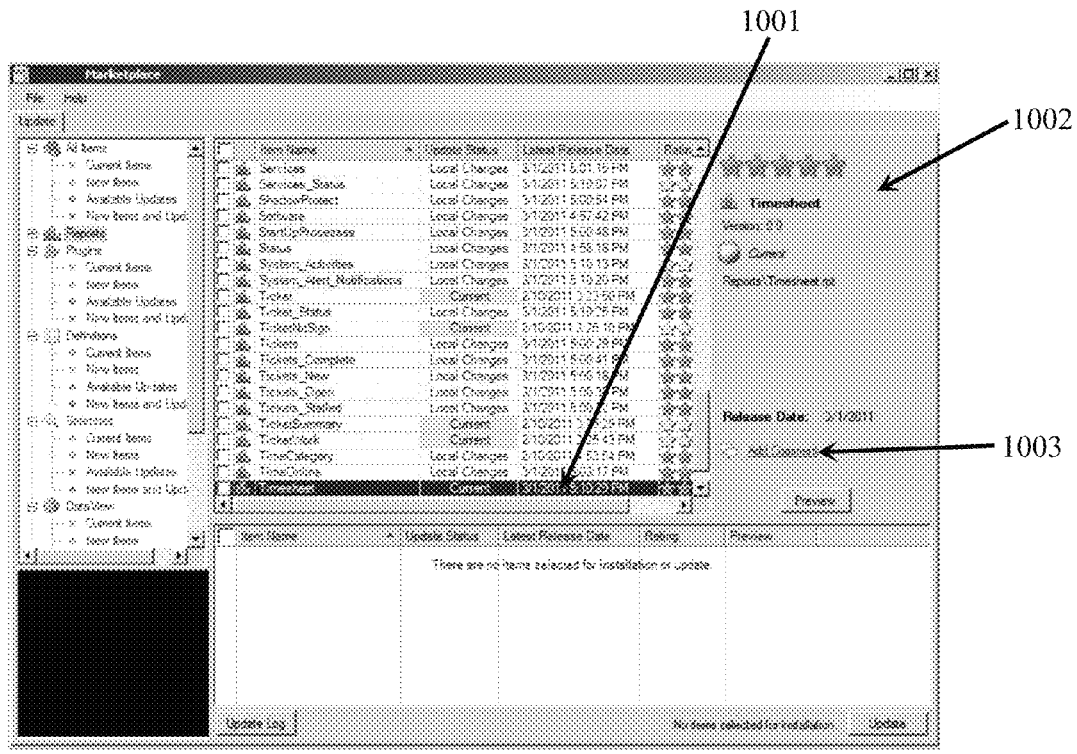
FIGS. 10A-C are illustrative examples of embodiments of a user interface for accessing a user review in an online marketplace.
Figures 10B, 10C:
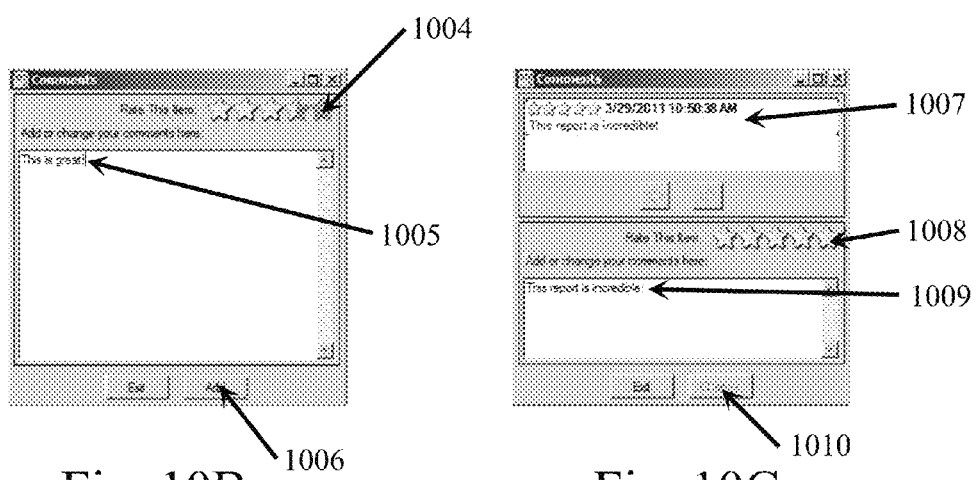

FIG. 10 is an illustrative example of an embodiment of a user interface for accessing a user review in an online marketplace. The marketplace may be more efficient by providing information about competitive RMM accessory items, using ratings and reviews 405 that may allow partners 208 to better understand the value and effectiveness of an RMM accessory item before purchasing and using it. FIG. 10A is an illustrative example of an embodiment of a user interface for the overview of the ratings and reviews. To comment on an RMM accessory item, a partner 208 may first select 1001 the RMM accessory item in the list of RMM accessory items. This may display information about the RMM accessory item in the information display area 1002, along with a link 1003 to add a comment. The partner may select the link 1003. FIG. 10B is an illustrative example of an embodiment of a user interface for adding a new rating and review of a single RMM accessory item. Selecting the link 1003 may bring up an interface that allows the partner 208 to rate 1004 the RMM accessory item, as well as adding a review 1005 about the RMM accessory item. The partner 208 may then select the "Add" button 1006 to submit the rating and review. FIG. 10C is an illustrative example of an embodiment of a user interface for viewing editing an existing rating and review of a single RMM accessory item. A partner 208 may view an existing rating and review 1007. The partner 208 may also edit a rating 1008 and review 1009 that is one originally created by them, and then may submit 1010 the changes when finished.

Figure 11:
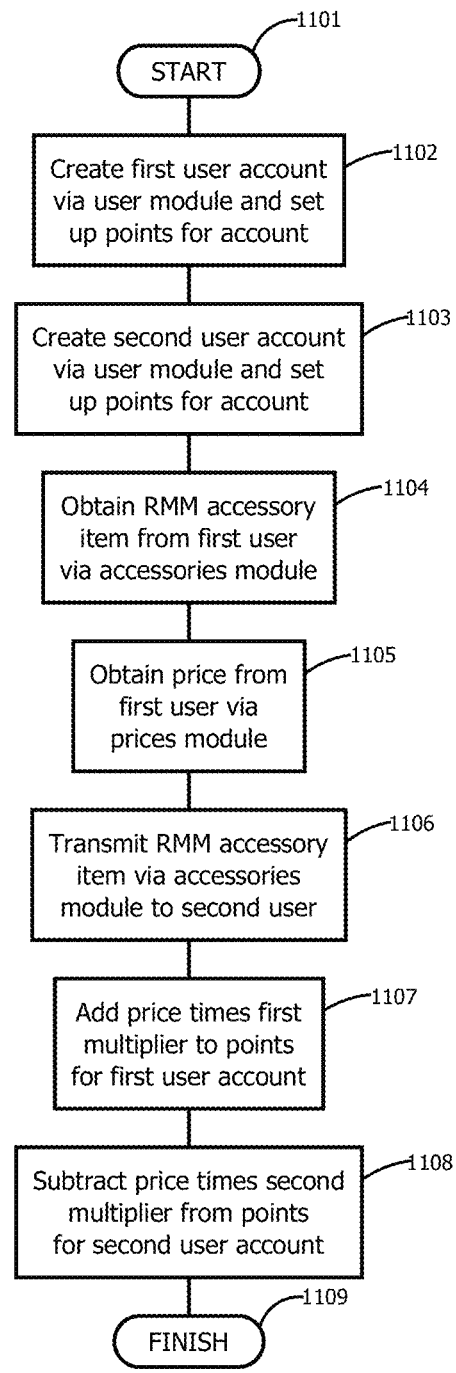
FIG. 11 is an illustrative flowchart depicting one embodiment of a method for an online marketplace for accessories of an RMM product.

FIG. 11 is an illustrative flowchart depicting one embodiment of a method for an online marketplace for accessories of an RMM product. The method starts at step 1101. Step 1102 creates a first user account 404a via the user module 103 and sets up the points for that account. Step 1103 creates a second user account 404b via the user module 103 and sets up the points for that account. Step 1104 obtains an RMM accessory item from the first user 208c via the accessories module 104. Step 1105 obtains the price of the RMM accessory item from the first user 208c via the prices module 105. Step 1106 transmits the RMM accessory item via the accessories module 104 to the second user 208e. Step 1107 adds the price times a first multiplier 102 to the points in the first user account 404a. Step 1108 subtracts the price times a second multiplier 101 from the points in the second user account 404b. The method finishes at step 1109.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system to improve performance of remote end user devices via a remote monitoring and management ("RMM") product configured to monitor and manage the remote end user devices via a computer network, comprising:
    a server comprising a processor;
    a user module executed by the server to:
        create a first user account for a first user device of the system, wherein the first user account corresponds to a seller of RMM accessory items and indicates a first number of points;
        create a second user account for a second user device of the system, wherein the second user account indicates a second number of points, and the second user account corresponds to a buyer of RMM accessory items that provides remote monitoring and management of a plurality of remote devices via the RMM product;
        receive, from the second user device via the computer network, configuration information for the plurality of remote devices remotely monitored and managed by the second user device;
        associate, in a database in memory, the received configuration information with the second user account;
    an accessories module executed by the server to obtain, from the first user device via the computer network, a first RMM accessory item for the RMM product, the first RMM accessory item comprising at least one of a monitor, a data view, an antivirus definition, a search, a report, a script, a system component, a plugin, a probe, and a definition;
    a prices module executed by the server to obtain, from the first user device via the computer network, a price for the first RMM accessory item, wherein the price comprises a third number of points;
    the accessories module executed by the server to:
        identify, based on the configuration information associated with the second user account in the database and a status value of the first RMM accessory item, the first RMM accessory item as available for the plurality of remote devices remotely monitored and managed by the second user device via the RMM product, the status value indicating a relationship between the first RMM accessory item and the RMM product;
        transmit, via the computer network responsive to receiving an indication of interest in the first RMM accessory item from the second user device and based on the identification of the first RMM accessory item as available for the plurality of remote devices remotely monitored and managed by the second user device via the RMM product, the first RMM accessory item to the second user device causing the second user device to install the first RMM accessory item improving the performance of the plurality of remote devices monitored and managed by the second user device via the RMM product; and the prices module executed by the server to:
        add, to the first number of points, a first multiplier times the price; and
        subtract, from the second number of points, a second multiplier times the price.

2. The system of claim 1, wherein the value of the price is zero.

3. The system of claim 1, wherein:
    the first multiplier is a number greater than zero and less than or equal to one; and the second multiplier is a number greater than or equal to one.

4. The system of claim 1, further configured to:
recommend, for the second user device, based on a history of activity by the second user device, the first RMM accessory item.

5. The system of claim 1, further configured to:
obtain, from the first user device via the accessories module, a newer version of the first RMM accessory item; and
responsive to the obtaining the newer version, transmit, via the accessories module, to the second user device, the newer version.

6. The system of claim 1, wherein the first RMM accessory item is a remedy for a zero-day attack.

7. The system of claim 1, further configured to:
obtain, from a third user device affiliated with the provider of the RMM product, via the accessories module, a second RMM accessory item; and
receive, from the third user device via the prices module, a price for the second RMM accessory item, wherein the price is a fourth number of points.

8. The system of claim 7, further configured to:
recommend, for the second user device, based on a history of activity by the second user device, the second RMM accessory item.

9. The system of claim 7, further configured to:
obtain, from the third user device via the accessories module, a newer version of the second RMM accessory item; and
responsive to the obtaining the newer version, transmit, via the accessories module, to the second user device, the newer version.

10. The system of claim 7, wherein the second RMM accessory item is a remedy for a zero-day attack.

11. A method of improving performance of remote end user devices via a remote monitoring and management ("RMM") product configured to monitor and manage the remote end user devices via a computer network, comprising:
creating, via a user module of an online marketplace system comprising one or more processors, a first user account for a first user device of the online marketplace system, wherein the first user account corresponds to a seller of RMM accessory items and indicates a first number of points;
creating, via the user module, a second user account for a second user device of the online marketplace system, wherein the second user account indicates a second number of points, and the second user account corresponds to a buyer of RMM accessory items that provides remote monitoring and management of a plurality of remote devices via the RMM product;
receiving, from the second user device via the computer network, configuration information for the plurality of remote devices remotely monitored and managed by the second user device;
associating, in a database in memory, the received configuration information with the second user account;
obtaining, by an accessories module of the online marketplace system from the first user device via the computer network, a first RMM accessory item for the RMM product, the first RMM accessory item comprising at least one of a monitor, a data view, an antivirus definition, a search, a report, a script, a system component, a plugin, a probe, and a definition;
obtaining, by a prices module of the online marketplace system from the first user device via the computer network, a price for the first RMM accessory item, wherein the price is a third number of points;
identifying, based on the configuration information associated with the second user account in the database and a status value of the first RMM accessory item, the first RMM accessory item as available for the plurality of remote devices remotely monitored and managed by the second user device via the RMM product, the status value indicating a relationship between the first RMM accessory item and the RMM product;
transmitting, responsive to receiving an indication of interest in the first RMM accessory item from the second user device and based on the identification of the first RMM accessory item as available for the plurality of remote devices remotely monitored and managed by the second user device via the RMM product, the first RMM accessory item to the second user device causing the second user device to install the first RMM accessory item improving the performance of the plurality of remote devices monitored and managed by the second user device via the RMM product; and
adding, to the first number of points, a first multiplier times the price; and
subtracting, from the second number of points, a second multiplier times the price.

12. The method of claim 11, wherein the value of the price is zero.

13. The method of claim 11, wherein:
the first multiplier is a number greater than zero and less than or equal to one; and
the second multiplier is a number greater than or equal to one.

14. The method of claim 11, further comprising:
recommending, to the second user device, based on a history of activity by the second user device, the first RMM accessory item.

15. The method of claim 11, further comprising:
obtaining, from the first user device, a newer version of the first RMM accessory item; and
responsive to obtaining the newer version, transmitting, to the second user device, the newer version.

16. The method of claim 11, wherein the first RMM accessory item is a remedy for a zero-day attack.

17. The method of claim 11, further comprising:
obtaining, from a third user device affiliated with the provider of the RMM product via the accessories module, a second RMM accessory item; and
receiving, from the third user device via the prices module, a price for the second RMM accessory item, wherein the price is a fourth number of points.

18. The method of claim 17, further comprising:
recommending, to the second user device, based on a history of activity by the second user device, the second RMM accessory item.

19. The method of claim 17, further comprising:
obtaining, from the third user device, a newer version of the second RMM accessory item; and
responsive to obtaining the newer version, transmitting, to the second user device, the newer version.

20. The method of claim 17, wherein the second RMM accessory item is a remedy for a zero-day attack.

21. A non-transitory computer-readable storage device having instructions that are executable to cause one or more processors to improve performance or remote end user devices via a remote monitoring and management ("RMM") product configured to monitor and manage the remote end user devices, the instructions comprising instructions to:

create a first user account for a first user device of an online marketplace system, wherein the first user account corresponds to a seller of RMM accessory items and indicates a first number of points;

create a second user account for a second user device of the an online marketplace system, wherein the second user account indicates a second number of points, and the second user account corresponds to a buyer of RMM accessory items that provides remote monitoring and management of a plurality of remote devices via the RMM product;

receive, from the second user device via a computer network, configuration information for the plurality of remote devices remotely monitored and managed by the second user device;

associate, in a database in memory, the received configuration information with the second user account;

obtain, from the first user device via the computer network, a first RMM accessory item for the RMM product, the first RMM accessory item comprising at least one of a monitor, a data view, an antivirus definition, a search, a report, a script, a system component, a plugin, a probe, and a definition;

obtain, from the first user device via the computer network, a price for the first RMM accessory item, wherein the price comprises a third number of points;

identify, based on the configuration information associated with the second user account in the database and a status value of the first RMM accessory item, the first RMM accessory item as available for the plurality of remote devices remotely monitored and managed by the second user device via the RMM product, the status value indicating a relationship between the first RMM accessory item and the RMM product;

transmit, via the computer network responsive to receiving an indication of interest in the first RMM accessory item from the second user device and based on the identification of the first RMM accessory item as available for the plurality of remote devices remotely monitored and managed by the second user device via the RMM product, the first RMM accessory item to the second user device causing the second user device to install the first RMM accessory item improving the performance of the plurality of remote devices monitored and managed by the second user device via the RMM product; and add, to the first number of points, a first multiplier times the price; and subtract, from the second number of points, a second multiplier times the price.

22. The computer-readable storage medium of claim 21, wherein the value of the price is zero.

23. The computer-readable storage medium of claim 21, wherein:
the first multiplier is a number greater than zero and less than or equal to one; and
the second multiplier is a number greater than or equal to one.

24. The computer-readable storage medium of claim 21, wherein the instructions further comprise instructions to:
recommend, to the second user device, based on a history of activity by the second user device, the first RMM accessory item.

25. The computer-readable storage medium of claim 21, wherein the instructions further comprise instructions to:
obtain, from the first user device, a newer version of the first RMM accessory item; and
responsive to the obtaining the newer version, transmit, to the second user device, the newer version.

26. The computer-readable storage medium of claim 21, wherein the first RMM accessory item is a remedy for a zero-day attack.

27. The computer-readable storage medium of claim 21, wherein the instructions further comprise instructions to:
obtain, from a third user device affiliated with the provider of the RMM product, a second RMM accessory item; and
receive, from the third user device, a price for the second RMM accessory item, wherein the price is a fourth number of points.

28. The computer-readable storage medium of claim 27, wherein the instructions further comprise instructions to:
recommend, to the second user device, based on a history of activity by the second user device, the second RMM accessory item.

29. The computer-readable storage medium of claim 27, wherein the instructions further comprise instructions to:
obtain, from the third user device, a newer version of the second RMM accessory item; and
responsive to the obtaining the newer version, transmit, to the second user device, the newer version.

30. The system of claim 1, wherein the first RMM accessory item comprises the script, and the server is further configured to:
receive, from a first remote device of the plurality of remote devices, a first performance metric of the first remote device prior to installation of the script;
install, responsive to the identification of the first RMM accessory item as compatible with the plurality of remote devices, the script on the first remote device;
receive, from the first remote device, a second performance metric of the device subsequent to the installation of the script; and
verify an improvement from the first performance metric to the second performance metric.

* * * * *